United States Patent [19]
Ohsumi

[11] Patent Number: 5,718,160
[45] Date of Patent: Feb. 17, 1998

[54] POSITIONING DEVICE

[75] Inventor: Yuzaburo Ohsumi, Shiga, Japan

[73] Assignee: Kyocera Corporation, Kyoto, Japan

[21] Appl. No.: 593,837

[22] Filed: Jan. 30, 1996

[30] Foreign Application Priority Data

Jan. 31, 1995 [JP] Japan .................................. 7-014810
Aug. 31, 1995 [JP] Japan .................................. 7-223110

[51] Int. Cl.$^6$ ........................ F01B 19/00; F01B 29/00; F01C 9/00
[52] U.S. Cl. ........................ 92/35; 92/88; 92/122; 92/117 A; 92/DIG. 2
[58] Field of Search ............... 92/88, 121, 122, 92/127, 117 R, 117 A, 34, 35, DIG. 2

[56] References Cited

U.S. PATENT DOCUMENTS

| | | | |
|---|---|---|---|
| 2,627,876 | 2/1953 | Goddard | 92/35 |
| 3,110,228 | 11/1963 | Shramo et al. | 92/122 X |
| 4,045,958 | 9/1977 | Wells | 92/122 X |
| 5,014,602 | 5/1991 | Iwata | 92/117 A |
| 5,040,332 | 8/1991 | Aquilina | 92/88 X |
| 5,218,896 | 6/1993 | Furukawa | 92/DIG. 2 X |
| 5,507,218 | 4/1996 | Lipinski | 92/88 |

FOREIGN PATENT DOCUMENTS

| | | | |
|---|---|---|---|
| 3176804 | 7/1988 | Japan | 92/88 |
| 1275964 | 11/1989 | Japan | 92/88 |
| 0883549 | 11/1981 | U.S.S.R. | 92/DIG. 2 |
| 1040237 | 9/1983 | U.S.S.R. | 92/DIG. 2 |

*Primary Examiner*—Hoang Nguyen
*Attorney, Agent, or Firm*—Loeb & Loeb LLP

[57] ABSTRACT

A positioning device having a high rigidity and smooth positioning characteristics. The positioning device holds a piston formed integrally with a table within a cylinder and has pressure-adjusting elements in two pressurizing chambers in the cylinder partitioned with the piston. A gas is ejected into a clearance between the piston and the cylinder to hydrostatically support the piston. The emitted gas is introduced into the two pressurizing chambers to drive the piston and the table by the pressure difference between the pressurizing chambers. The pressure-adjusting elements include nozzles for emitting the gas in the pressurizing chambers and pressure-adjusting bodies for changing the opening degree of the ejecting port of the nozzles.

6 Claims, 8 Drawing Sheets

000
POSITIONING DEVICE

BACKGROUND OF THE INVENTION

The present invention relates to a positioning device used for measurement and machining devices.

Conventionally, as a positioning device having relatively large strokes used for various machine tools and measuring devices, there have been used positioning devices such as a cylinder servo-type shown in FIG. 8, a screwed servo-type shown in FIG. 9, and a linear motor servo-type shown in FIG. 10.

The one shown in FIG. 8 comprises a table 52 supported movably in a linear direction on a support 51, and an air cylinder 58 for driving this table 52. And this air cylinder 58 has been so constituted as to drive a piston 55 by a pressure difference of two pressurizing chambers partitioned by the piston 55 arranged in a cylinder 59, thus to drive the table 52 connected to this piston 55 by a connecting rod 56. Furthermore, the table 52 has been provided with a linear scale 53, and predetermined positioning has been made possible by detecting the position of the table 52 with a detection head 54 and by feedbacking the position to the air cylinder 58.

Furthermore, the screwed serve-type device shown in FIG. 9 is such that a nut 60 of a ball screw is attached to the table 52 which is supported on the support 51 and the table 52 is driven in a linear direction by rotating a screw 61 meshed with this nut 60 by a motor 62.

Furthermore, the linear motor servo-type device shown in FIG. 10 is such that a supporting body 51 and a table 52 form a linear motr to drive a table 52 directly.

However, the above-mentioned conventional positioning devices have problems described below.

First, in the cylinder servo-type device in FIG. 8, since the pistion 55 slides via the inside of the cylinder 59 and a sealing member 57, dynamic resistance or dynamic reaction force is added, and the positioning precision is deteriorated due to the difference of such resistance or reaction force. For example, in the case of a direct-acting cylinder having a diameter of 40 mm which uses a resin-type sealing member 57, the sliding resistance is 1.52N in average and causes differences of 2σ=0.35N. And in a servo mechanism using hydraulic pressure of 2 MPa, the repeated positioning precision (2σ) could be only as good as 1.2 μm.

Furthermore, the difference of this dynamic resistance or dynamic reaction force also affects the operating speed, and there has been such a problem that the dynamic positioning precision when a smooth machining is required, for example, in the case of a laser machining device, is greatly deteriorated. For example, in the above-mentioned hydraulic servo, the difference (2σ) in dimension at the time of machining at a rate of 3 m/min. has been as large as 4.5 μm.

Furthermore, the difference of dynamic resistance or dynamic reaction force leads to changes of rigidity in the operating axial direction, and when it is used for the work feed of a lathe, a milling machine and the like, there has been such a problem that a wave-like pattern is caused in the worked face and the work precision is deteriorated.

Next, in the screwed servo-type device in FIG. 9, though the positioning precision is improved, the joint of the nut 60 and the screw axis 61 becomes a point or a line, thereby vibrations and rigidity deterioration are generated. And when a ball screw is used, there is caused changes of the rigidity in the axial direction due to the difference of the ball diameters, thus there has been a problem that the work precision is poor.

Lastly, the linear servo motor-type device using a hydrostatic slide shown in FIG. 10 has good stability and good positioning precision, however, it has such a problem that the factor to retain the table 52 in the operating axial direction is only the retaining force of the linear motor, thus the rigidity in the operating axial direction is extremely low. Therefore, though it can be used for measurement and laser machining devices, it is not suitable for the work feed by lathes and miling machines.

Therefore, in the conventional positioning devices, there has been no device which has high rigidity of a cylinder servo-type device, as well as a smooth positioning characteristic of a linear servo motor-type device.

Considering the above-mentioned problems, the present invention is a positioning device which holds a piston with a table within a cylinder, and has pressure-adjusting means in two pressurising chambers in the cylinder partitioned with said piston, ejecting a gas into a clearance between said piston and the cylinder to hydrostatically support the piston as well as introducing this emitted gas into said two pressurizing chambers to drive the piston and the table by the pressure difference between both pressurising chambers, wherein the pressure-adjusting means provided in said two pressurizing chambers are composed of nozzles emitting a gas in the pressurising chambers and pressure-adjusting bodies for changing the opening degree of the ejecting port of said nozzles.

Furthermore, the present invention is a positioning device which supports a table on a shaft movably in the axial direction, and has pressure-adjusting means in two pressurising chambers, respectively, formed with sealing members flexible in the linear direction on the end faces of said table, ejecting a gas into a clearance between said table and said shaft to hydrostatically support the table as well as introducing this ejected gas into said two pressurizing chambers to drive the table by the pressure difference between both pressurising chambers, wherein the pressure-adjusting means provided in said two pressurizing chambers are composed of nozzles emitting a gas in the pressurising chambers and pressure-adjusting bodies for changing the opening degree of the ejecting port of said nozzles.

Furthermore, the present invention is a positioning device which holds a rotating body integrally forming a rotating axial portion in a cylindrical form and a roughly fan-shaped driving portion rotatably in the inner space of the cylinder, and has pressure-adjusting means, respectively, in two kinds of pressurizing chambers formed between the driving portion of said rotating body and the inner space of the cylinder, ejecting a gas into a clearance between said rotating body and the cylinder to hydrostatically support the rotating body as well as introducing this ejected gas into said two kinds of pressurizing chambers to drive the rotating body in the rotational direction by the pressure difference between both pressurising chambers, wherein the pressure-adjusting means provided in said two kinds of pressurizing chambers are composed of nozzles emitting a gas in the pressurising chambers and pressure-adjusting bodies for changing the opening degree of the ejecting port of said nozzles.

The positioning device according to the present invention can vibrate a piston, a rotating body and the like by adjusting the pressure in each pressurizing chamber with a pressure-adjusting means. At this time, since the positioning device has a cylinder servo-type mechanism, it can make the rigidity high in the driving direction, and since it supports hydrostatically the piston, the rotating body and the like, the dynamic resistance and the dynamic reaction force become quite small, furthermore, since it has no sliding or bending portion, there is no change with lapse of time, thus repeated positioning is made possible stably for a long period of time.

Futhermore, the pressure-adjusting means in each pressurizing chamber can increase the pressure in the pressurizing chamber if the opening degree of the ejecting hole of the nozzle is made small by slightly driving the pressure-adjusting board, and, on the contrary, can decrease the pressure in the pressurizing chamber if the opening degree of the ejecting hole of the nozzle is made large. Namely, only by adjusting the opening degree with the pressure-adjusting board, the pressure in the pressurizing chamber can be easily adjusted.

EMBODIMENTS

The first embodiment of the present invention will now be described with reference to the accompanying drawings.

Figure 1:
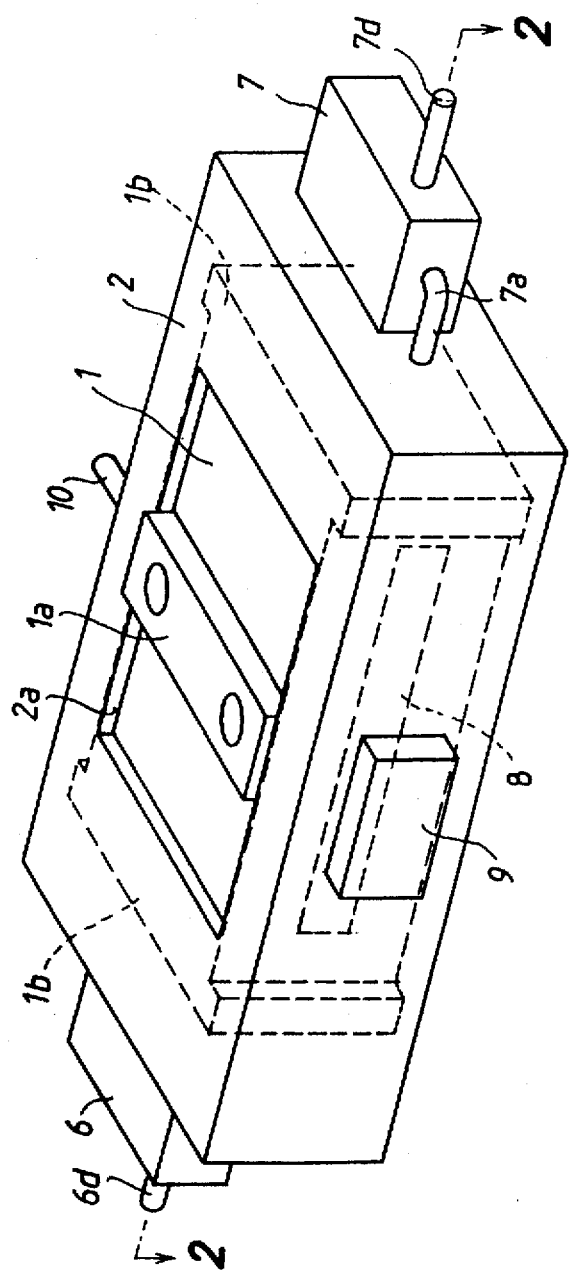
FIG. 1 is a perspective view showing the positioning device of the present invention.
Figure 2:
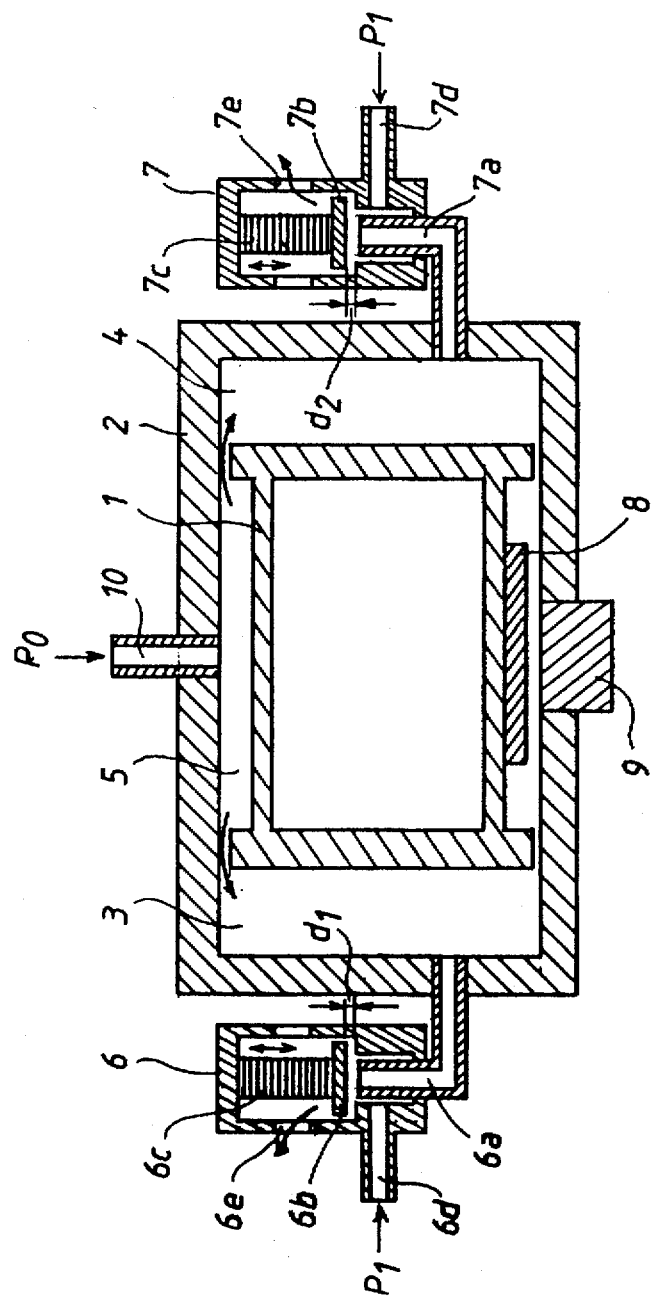
FIG. 2 is a sectional view along the line X—X of FIG. 1.

As a schematic perspective view is shown in FIG. 1 and a sectional view is shown in FIG. 2, respectively, the positioning device of the present invention is so constituted that a piston 1 integrally formed with a table 1a is disposed in a cylinder 2, said table 1a being exposed outside from an opening portion 2a of the cylinder 2, and pressure-adjusting portions 6 and 7 are provided, respectively communicated with two pressurizing chambers 3 and 4 in the cylinder 2 partitioned with the piston 1. In addition, the piston 1 is made hollow for making it light, and a gas groove 1b is provided on both end portions of the face including the table 1a, for the shield and the hydrostatic bearing between the opening portion 2a and respective pressurizing chambers 3 and 4.

Furthermore, a gas supply hole 10 for supplying a gas at a pressure of $P_0$ is provided on the portion corresponding to the side face of the piston 1 in the cylinder 2, a linear scale 8 is provided on the other side face of the piston 1, and a detection head 9 is provided on the inner wall of the cylinder 2 corresponding thereto, to constitute a position encoder, thus the position of the piston 1 can be detected.

Said pressure-adjusting portions 6 and 7 include nozzles 6a and 7a communicated with the pressurizing chambers 3 and 4, pressure-adjusting boards 6b and 7b as pressure-adjusting bodies arranged on the ejecting sides of said nozzles 6a and 7a, and piezoelectric actuators 6c and 7c for varying the distances $d_1$ and $d_2$ between nozzles 6a, 7a and said pressure-adjusting boards 6b, 7b by driving said pressure-adjusting boards 6b and 7b, and also include pressure supply holes 6d and 7d for supplying a gas at a pressure $P_1$ to the periphery of said nozzles 6a and 7a, and exhaust holes 6e and 7e for letting the supplied gas escape therefrom.

In this pressure-adjusting portions 6 and 7, the gas in the pressurizing chambers 3 and 4 ejects from the nozzles 6a and 7a, is mingled with the gas from the pressure supply holes 6d and 7d, and exhausted from the exhaust holes 6e and 7e while being subject to the resistance by the pressure-adjusting boards 6b and 7b. Furthermore, said piezoelectric actuators 6c and 7c have a structure laminated with multiple piezoelectric elements, and can be flexibly driven minutely in the laminated direction (shown in an arrow) by applying the voltage.

Therefore, if the piezoelectric actuators 6c and 7c are expanded to make the distances $d_1$ and $d_2$ small between nozzles 6a, 7a and pressure-adjusting boards 6b, 7b, the opening degree of nozzles 6a and 7a becomes small to increase the resistance against the gas ejection, and as a result, the pressure in the pressurizing chambers 3 and 4 can be made high. On the contrary, if the piezoelectric actuators 6c and 7c are contracted to make the distances $d_1$ and $d_2$ large, the opening degree of nozzles 6a and 7a becomes large to decrease the resistance against the gas ejection, and as a result, the pressure in the pressurizing chambers 3 and 4 can be made low. Namely, by controlling the application of voltage to the piezoelectric actuators 6c and 7c and flexibly driving the piezoelectric actuators 6c and 7c, the pressure in the pressurizing chambers 3 and 4 can be adjusted. In addition, though not shown, in order to improve the linearity of the piezoelectric actuators 6c and 7c, pre-pressure may be applied in the contracted direction of the piezoelectric actuators 6c and 7c by using a spring and the like.

Next, the action of the positioning device of the present invention will be described.

First, a gas is ejected from the gas supply hole 10 to the clearance 5 between the piston 1 and the cylinder 2, to hydrostatically support the piston 1 and the table 1a in the cylinder 2. The ejected gas flows into two pressurizing chambers 3 and 4 and acts so as to increase the pressure of both pressurizing chambers 3 and 4, however, it is adjusted to be a constant pressure by pressure-adjusting portions 6 and 7, respectively. And, if there is pressure difference between the pressurizing chambers 3 and 4, by adjusing the application of voltage to the two piezoelectric actuators 6c and 7c, the piston 1 and the table 1a will move according to the pressure difference.

Figure 3:
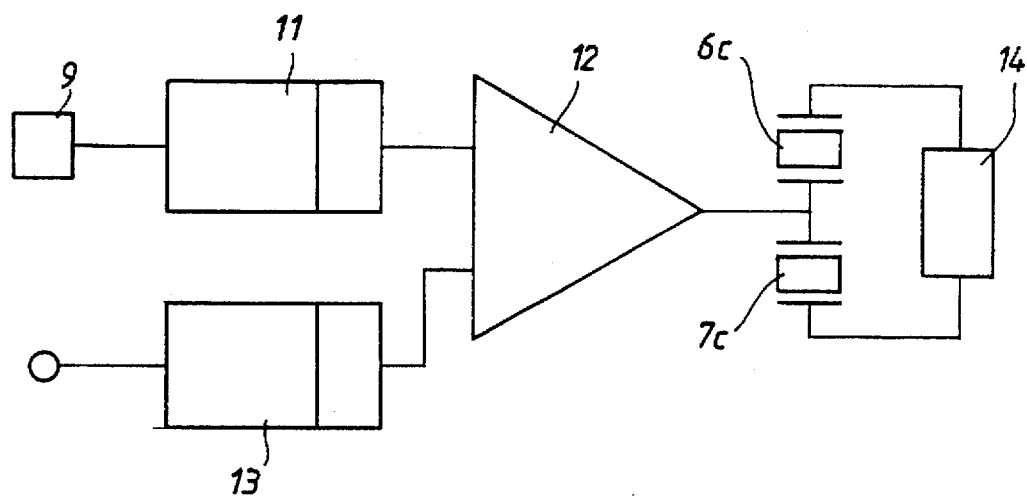
FIG. 3 is a view illustrating the control method in the positioning device of the present invention.

At this time, the positioning of the piston 1 is carried out, as shown in FIG. 3, such that the signal generated from the detection head 9 constituting the position encoder is reckoned as the absolute position information by the position counter 11, and it is compared with the positioning information of the input pulse counter 13 having been input in advance, to control the application of voltage from the linear power supply 14 to the piezoelectric actuators 6c and 7c by the servo amplifier 12. And, if the positioning informations of the position counter 11 and the input pulse counter 13 are equal or the difference between them is in a certain range, the application of voltage to the piezoelectric actuators 6c and 7c is made equal to fix the piston 1.

Under this condition, if the piston 1 starts to move toward the pressurizing chamber 3 due to some causes, a signal is sent from the detection head 9 to make the difference of the position counter 11 negative, and respective piezoelectric actuators 6c and 7c are driven to increase the pressure on the pressurizing chamber 3 side, thus they are actuated in the direction to restore the piston 1 toward the pressuring chamber 4 side. On the contrary, if the piston 1 starts to move toward the pressurizing chamber 4, respective piezoelectric actuators 6c and 7c are driven to increase the pressure on the pressurizing chamber 4 side and automatically follow (servo) so that the piston 1 is always in the set position. In addition, the servo amplifier 12 is an amplifier containing the follow-up response element (proportion P, integration I, differential D), to increase the voltage by the difference of the position counter 11 for driving the piezoelectric actuators 6c and 7c in the voltage-actuating form.

As described above, the positioning device of the present invention has a cylinder servo-type mechanism, thereby the rigidity in the axial direction can be made as high as 10 kg/μm. Furthermore, since it hydrostatically supports the piston 1 in the cylinder 2, the dynamic resistance and the dynamic reaction force are quite small, and since there is no sliding or bending portion, there is no change with lapse of time, thereby repeated positioning can be made possible stably for a long period of time. Furthermore, since the table 1a is integrally formed with the piston 1, the positioning device of the present invention can be made down-sized.

Furthermore, since the pressure-adjusting portions 6 and 7 are composed of nozzles 6a, 7a and pressure-adjusting boards 6b, 7b, the structure thereof is made simpler and down-sized as compared with the case using a pressure-adjusting valve or the like. Furthermore, since it becomes possible to increase the exhaust quantity by making the diameters of nozzles 6a and 7a large, the operation speed can be made as fast as 2 m/second for the speed of the piston 1 and as high as 10G for the acceleration.

Furthermore, when the positioning device of the present invention is used for a machine tool, the shock absorbing property is high as it is hydrostatically supported, and it can work while measuring the load capacity.

In addition, it is preferred that the material consituting said positioning device of the present invention be formed by ceramics such as alumina, zirconia, silicon carbide, and silicon nitride from the standpoint of high rigidity, light weight, low thermal expansion ratio and the like.

Figure 4A:
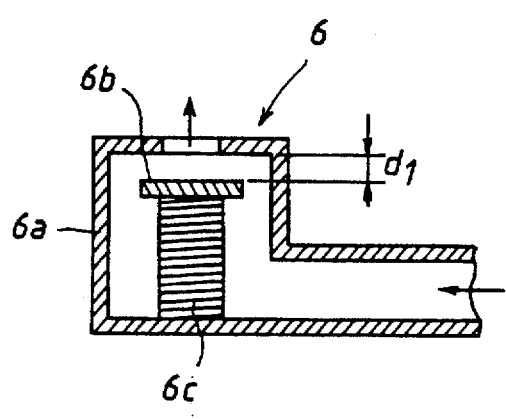
FIG. 4 (A) and (B) are sectional views showing other embodiments of the pressure-adjusting portion in the positioning device of the present invention.
Figure 4B:
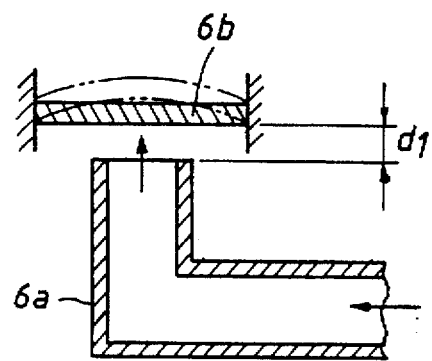

Furthermore, the other embodiment of the pressure-adjusting portions 6 and 7 may be such that, as shown in FIG. 4 (A), the pressure-adjusting board 6b and the piezoelectric actuator 6c are arranged inside of the nozzle 6 to adjust the distance $d_1$ between the ejecting port of the nozzle 6 and the pressure-adjusting board 6b. Alternatively, as shown in FIG. 4 (B), the pressure-adjusting board 6b itself arranged on the tip side of the nozzle 6a may be formed by a piezoelectric element which causes flexibility by the application of voltage, to adjust said distance $d_1$ by applying the voltage and bending the pressure-adjusting board 6. Furthermore, other than said piezoelectric element, a voice coil may be used, or a moving means utilizing the electromagnetic power such as a linear motor and the like may be used.

Furthermore, the pressure-adjusting boards 6b and 7b may be vibrated at a certain frequency. In addition, in said embodiment, a plate-like pressure-adjusting boards 6b and 7b are used, but it is not limited to the plate-like form.

Furthermore, it can be operated without the pressure supply holes 6d and 7d, but by supplying the pressure $P_1$, the pressure in the pressurizing chambers 3 and 4 can be increased, thereby the ejecting speed from nozzles 6a and 7a can be accelerated.

Alternatively, a rotary servo valve may be used as the pressure-adjusting boards 6 and 7. This is to combine two cylindrical bodies having holes on the side face thereof and to open/close both holes by rotating one of the cylindrical bodies.

Next, the second embodiment of the present invention will be described. (The identical parts with the above embodiment will be represented by the same reference numerals.)

Figure 5:
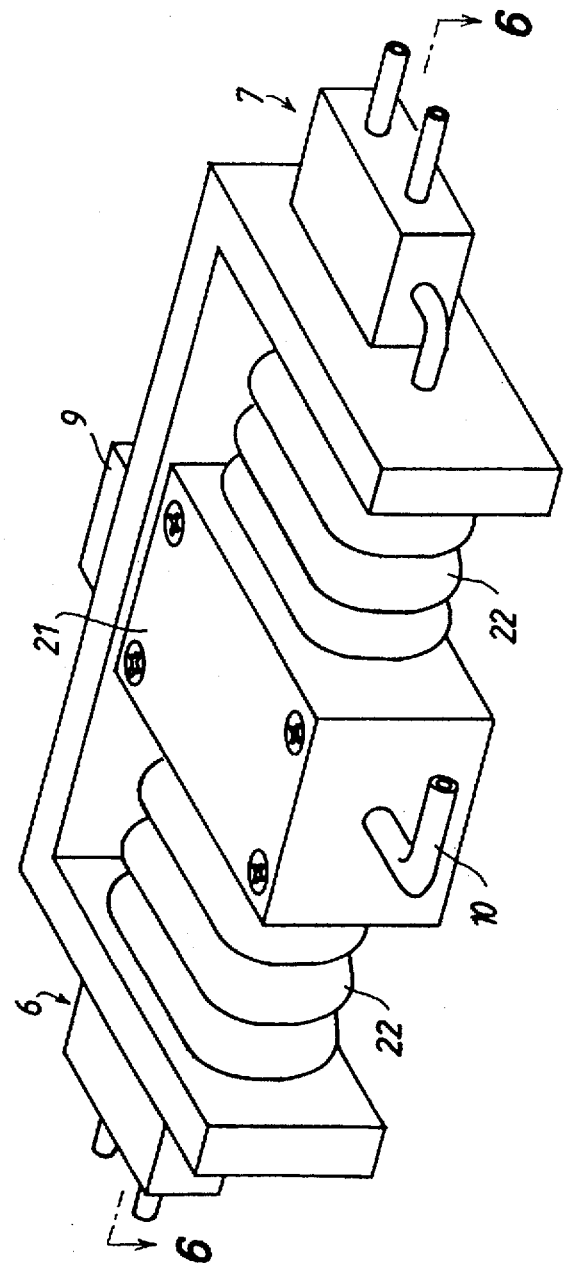
FIG. 5 is a perspective view showing other embodiment of the present invention.
Figure 6:
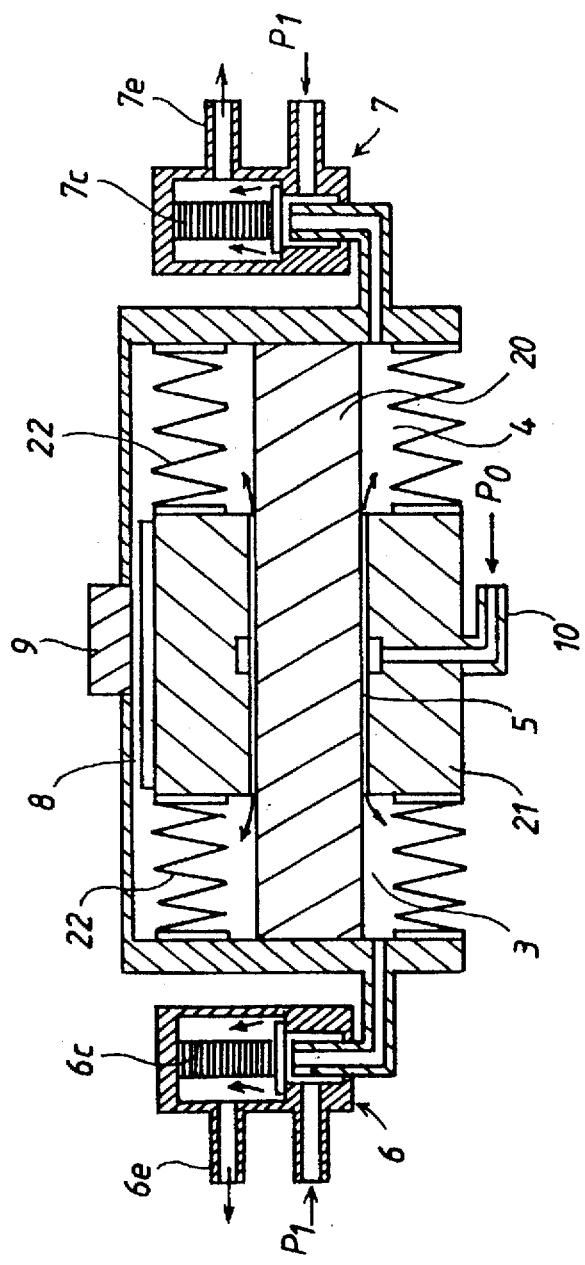
FIG. 6 is a sectional view along the line Y—Y of FIG. 5.

The positioning device, as the perspective view thereof is shown in FIG. 5 and the sectional view thereof is shown in FIG. 6, is so constituted that a shaft 20 is pierced to the breakthrough having a table 21 to support this table 21 movably in the linear direction. Moreover, on both end faces of the table 21, sealing members 22 flexible in the axial direction, such as metal bellows and the like are provided to form the pressurizing chambers 3 and 4, and pressure-adjusting portions 6 and 7 are arranged to communicate with each pressurizing chamber 3 and 4.

Furthermore, a gas supply hole 10 is provided in the table 21, which supplies a gas at a pressure $P_0$ to the clearance 5 between the table 21 and the shaft 20. And on the side face of the table 21, a linear scale 8 is arranged as well as a detection head 9 arranged on the portion opposite thereto is provided, to form a position encoder, thereby the position of the table 21 can be detected.

Said pressure-adjusting portions 6 and 7 can adjust the pressure in the pressurizing chambers 3 and 4 by adjusting the opening degree with the piezoelectric actuators 6c and 7c, as in the aforementioned embodiment.

When this positioning device is actuated, first a gas is ejected to the clearance between the table 21 and the shaft 20 from the gas supply hole 10 to hydrostatically support the table 21 on the shaft 21. This ejected gas flows into two pressurizing chambers 3 and 4 to increase the pressure in both pressurizing chambers 3 and 4, while the pressure thereof is adjusted to be a certain level, respectively, by the pressure-adjusting portions 6 and 7. And, if the pressure difference is caused between the two pressurizing chambers 3 and 4 by adjusting the application of voltage to the two piezoelectric actuators 6c and 7c, the table 21 moves in the linear direction according to the pressure difference.

At this time, the sealing members 22 expand or contract in the axial direction according to the movement of the table 21, therefore, they may be formed flexibly by metal bellows and the like.

In this embodiment, the gas ejected from the gas supply hole 10 is entirely exhausted from the exhaust holes 6e and 7e, and it does not leak from other portions, thereby this embodiment may be used for the applications which require high cleanliness or in the environment other than the air atmosphere, such as in vacuum, in water and the like.

Furthermore, as other embodiments, the shaft 20 may be formed as a circular arc, and the table 21 can be moved circularly along this shaft 20.

Next, the third embodiment of the present invention will be described.

Figure 7B:
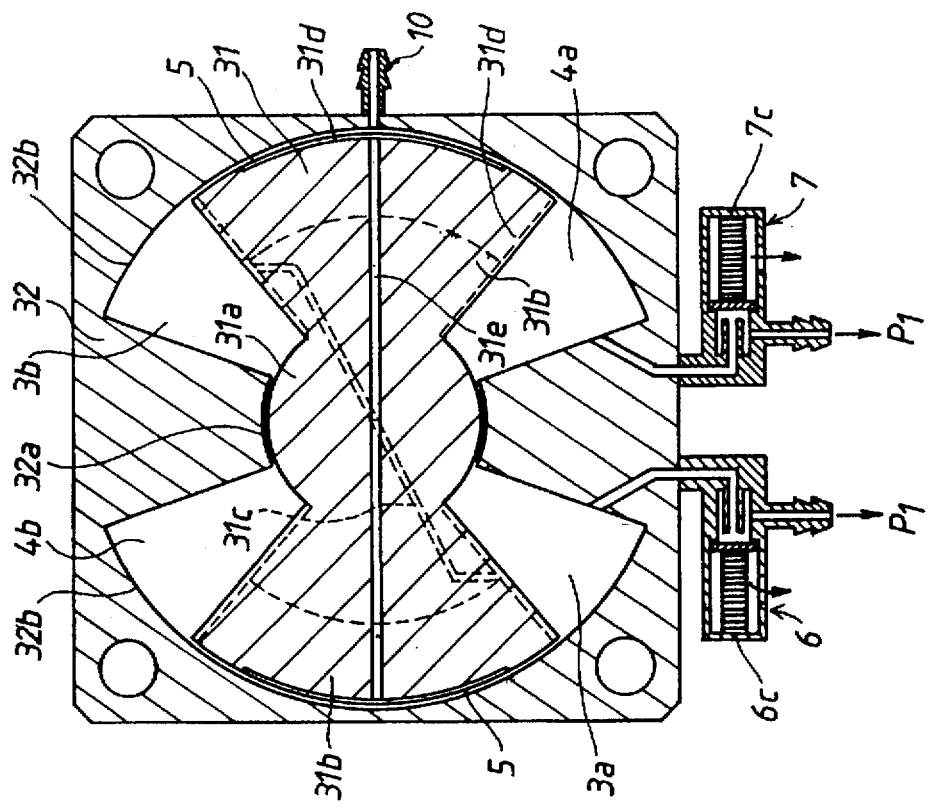
FIG. 7 (A) and (B) show other embodiment of the present invention, and (A) shows a side view and (B) shows a sectional view along the line Z—Z.
Figure 7A:
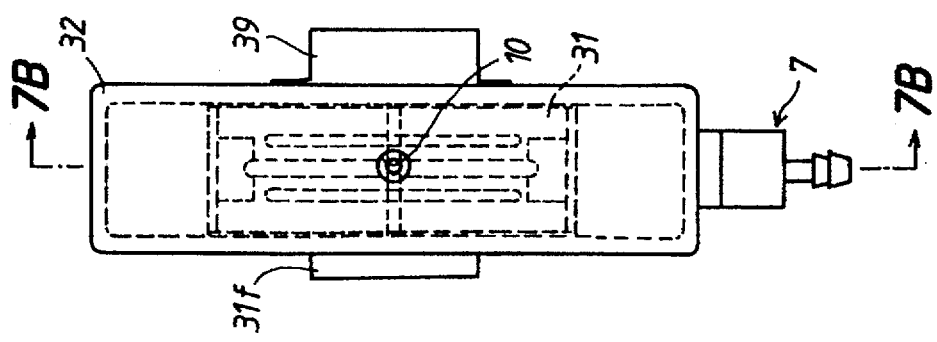
Figure 8:
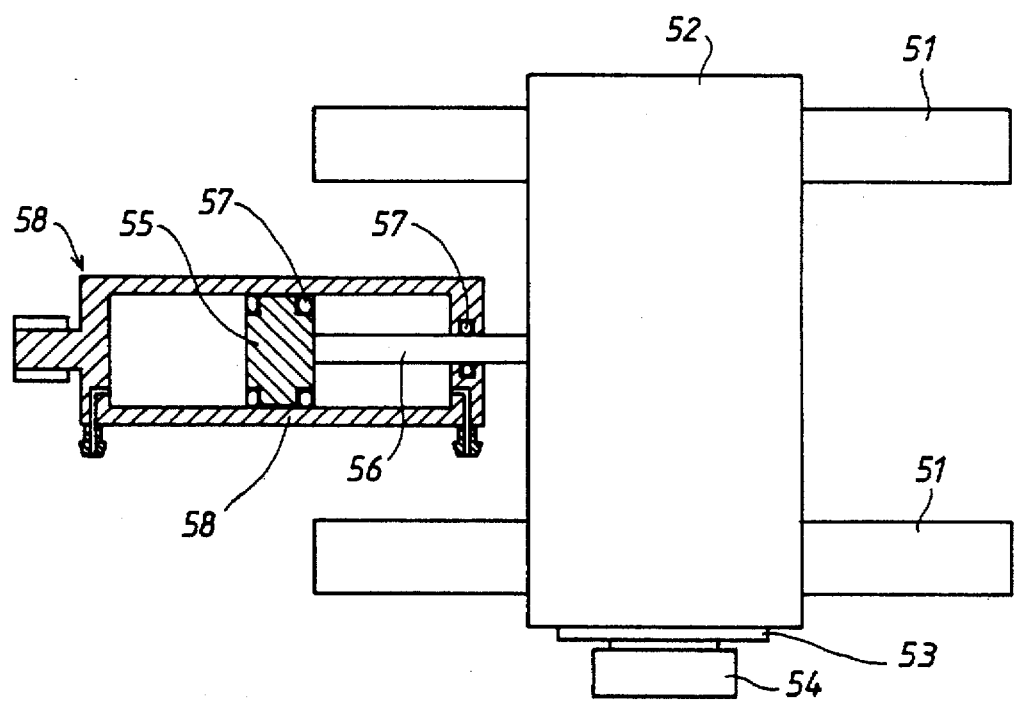
FIG. 8 is a plan view showing the conventional positioning device.
Figure 9:
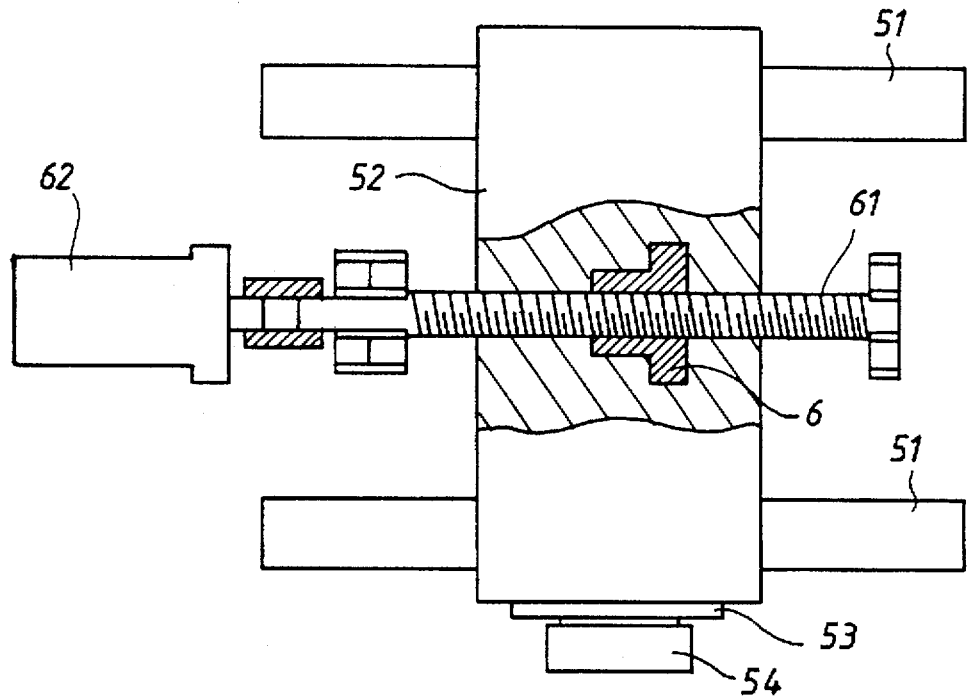
FIG. 9 is a plan view showing the conventional positioning device.
Figure 10:
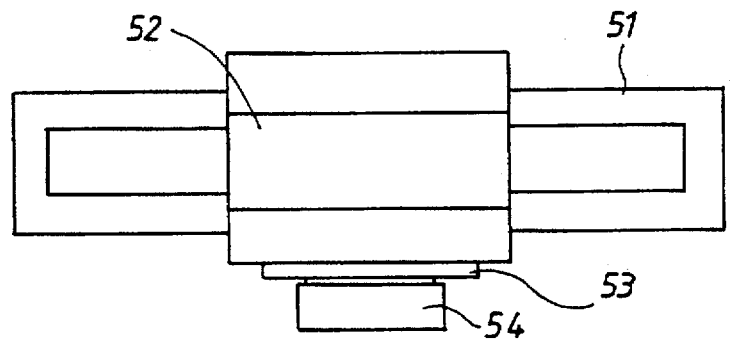
FIG. 10 is a plan view showing the conventional positioning device.

The positioning device, as the side view thereof is shown in FIG. 7 (A) and the sectional view thereof is shown in FIG. 7 (B), is a positioning device in the rotational direction in which a rotational body 31 is arranged in the inner space of the cylinder. The rotational body 31 has a shape that two roughly fan-shaped driving portions 31b are integrally formed on the side face of a cylindrical rotation axis 31a, while the inner space of the cylinder 32 has two projecting portions 32a opposite to the rotation axis 31a of said rotational body 31, and the driving portions 31b of said ratational body 31 have cylindrical portions 32b movable in the rotational direction. By inserting the rotational body 31 into this inner space, providing a minute clearance between the rotation axis 31a and the projecting portions 32a, and holding the outer periphery of the driving portions 31b by the cylindrical portions 32b, the rotational body 31 can be supported rotatably.

In addition, the number of driving portions 31b of the rotational body 31 is not limited to two, and it may be possible to form more than three.

Furthermore, since the cylindrical portions 32b of the inner space is larger than the driving portions 31b of the rotational body 31, in total four pressurizing chambers 3a, 3b, 4a and 4b are formed between both portions. Pressure-adjusting portions 6 and 7 are arranged so as to communicate with the pressurizing chambers 3a and 4a, while inside of the rotational body 31, there are provided circulating holes 31c and 31c communicating between the pressurizing chamber 3a and the pressurizing chamber 3b, and between the pressurizing chamber 4a and the pressurizing chamber 4b, respectively. In addition, in FIG. 7 (B), as it is a central sectional view, there is shown only a circulating hole 31c between the pressurizing chamber 3a and the pressurizing chamber 3b, however, a circulating hole 31c is similarly formed between the pressurizing chamber 4a and the pressurizing chamber 4b. Therefore, the pressurizing chamber 3a and 3b become the same pressure, and similarly the pressurizing chamber 4a and 4b become the same pressure, thus lastly two kinds of pressurizing chambers are formed.

In addition, said pressure-adjusting portions 6 and 7 are the same as in the aforementioned embodiment, and the pressure in the pressurizing chambers 3a and 4a can be adjusted by applying the voltage to the piezoelectric actuators 6c and 7c.

Furthermore, a gas supply hole 10 is provided in the cylinder for ejecting a gas to the clearance 5 between the outer periphery of the driving portion 31b of the rotational body 31 and the inner periphery of the cylindrical portion 32b of the cylinder 32. Moreover, the rotational body 31 has a gas groove 31d for supplying the ejected gas to the whole clearance 5 on the surface thereof, and a circulating hole 31e for supplyng a gas to the clearance 5 opposite to the gas supply hole 10.

Furthermore, on the one end of the rotational axis 31a of the rotational body 31, there is provided a ratational encoder 39 for detecting the rotational position, and the other end is guided outside to become a table 31f.

When this positioning device is actuated, first a gas is ejected to the clearance 5 between the rotationa body 31 and the cylinder 32 from the gas supply hole 10 to hydrostatically support the rotational body 31 in the cylinder 32. This ejecting gas flows into four pressurizing chambers 3a, 3b, 4a and 4b to increase the pressure in respective pressurizing chambers 3a, 3b, 4a and 4a, while the pressure thereof is adjusted to be a certain level, respectively, by the pressure-adjusting portions 6 and 7. And, if the pressure difference is caused between the two kinds of pressurizing chambers 3a and 3b and pressurizing chambers 4a and 4b by adjusting the application of voltage to the two piezoelectric actuators 6c and 7c, the rotational body 31 moves in the rotational direction according to the pressure difference.

In addition, in the embodiments shown in FIG. 5 to FIG. 7, it is preferred that the material of the table 21, shaft 20, rotational body 31, cylinder 32 and the like be formed by ceramics such as alumina, zirconia, silicon carbide, and silicon nitride.

Here, the positioning device of the present invention shown in FIGS. 1 and 2 was manufactured by way of trial. The piston 1 and the cylinder 2 were manufactured with alumina ceramics, ($Al_2O_3$: not less than 99% by weight) which was light and whose shape was hardly changed even if the temperature rose. And the piston 1 was made hollow and the moment of inertia was suppressed to be small. The size of the piston 1 was a square shape of 32×80 mm, the pressure-receiving area was about 25.6 $cm^2$, and the stroke length thereof was 52 mm.

It was so set that the inner diameter of the nozzles 6a and 7a in the pressure-adjusting portions 6 and 7 were 16 mm, the stroke length of the piezoelectric actuators 6c and 7c were 20 μm, and the distance $d_1$ and $d_2$ between the nozzles 6a, 7a and the pressure-adjusting boards 6b, 7b were in the range of 5 to 10 μm at a steady-state voltage.

When the pressure $P_0$ of the gas supply hole 10 was set to be 4 kgf/$cm^2$ and the pressure $P_1$ of the pressure supply hole 6d and 7d in the pressure-adjusting portions 6 and 7 was set to be 2 kgf/$cm^2$, the piston 1 was hydrostatically supported in the cylinder 2, and could be freely moved based on the positioning informations input to the input pulse counter 13.

The characteristics of the positioning devide at this time is as shown in Table 1. Thus, the driving device of the piston 1 could correspond up to 200 mm/sec. with the resolution of 0.1 μm, and up to 2 m/sec. with the resolution of 1 μm.

Furthermore, it was confirmed that the motion linearity of the piston 1 was as small as 0.4 μm/100 mm, and the pitching yawing was also as small as ±4 sec./100 mm, the repeated positioning precision (2σ) was as high as 0.3 μm which made positioning at high precision possible, and the rigidity in the axial direction was as high as 52 kg/$μm^2$.

TABLE 1

| | |
|---|---|
| Input pulse | 2 MHz |
| Positioning resolution | 0.1 μm   1 μm |
| Pitch of the linear scale | 20 μm |
| Maximum driving speed | 200 mm/sec.   2 m/sec. |
| Maximum acceleration | Not less than 10 G |
| Motion linearity | 0.4 μm/100 mm |
| Motion pitching, yawing | ±4 sec./100 mm |
| Precision of repeated positioning | 0.3 μm |
| Rigidity in the axial direction | 52 kg/μm |
| Servo system | P.I.D analog type |

Similarly, the positioning device shown in FIGS. 5 and 6 was manufactured by way of trial, and the characteristics thereof were measured. It was found that the bending resistance of the sealing member 22 was 0.2 g/μm, while the driving power was 12 kgf, the retained rigidity had sufficiently large value of 7.5 kgf/μm, and the positioning precision was less than ±0.2 μm (±2σ). Furthermore, with regard to the sliding property (pitching, yawing and rolling), all of them were not larger than 0.5 arcsec/100 mm.

Furthermore, the positioning device shown in FIG. 7 was manufactured by way of trial, and the characteristics were measured. It was found that the positioning precision was not larger than ±1 sec. (angle), and the positioning speed was not larger than 0.01 sec./60°.

As described above, according to the present invention, there is provided a positioning device which holds a piston formed integrally with a table within a cylinder, and has pressure-adjusting means in two pressurising chambers in the cylinder partitioned with said piston, ejecting a gas into a clearance between said piston and the cylinder to hydrostatically support the piston as well as introducing this emitted gas into said two pressurizing chambers to drive the piston and the table by the pressure difference between both pressurising chambers, wherein the pressure-adjusting means provided in said two pressurizing chambers are composed of nozzles emitting a gas in the pressurising chambers and pressure-adjusting bodies for adjusting the opening degree of the ejecting ports of said nozzles, whereby the personality in the axial direction can be made high, the dynamic resistance and dynamic reaction force are quite small, and since it has no sliding or bending portion therein, there is no change with lapse of time, thus, repeated positioning can be made possible stably for a long period of time.

Furthermore, since the pressure-adjusting portions are composed of nozzles and pressure-adjusting boards, the positioning device with various characteristics can be provided, which can be made small with a simple structure, as well as the operating speed of the piston can be made fast.

Furthermore, according to the present invention, a positioning device is so constituted that it supports a table on a shaft movably in the axial direction, and has the same pressure-adjusting means as described above in two pressurising chambers, respectively, formed with sealing members flexible in the linear direction on the end faces of said table, ejecting a gas into a clearance between said table and said shaft to hydrostatically support the table as well as introducing this ejected gas into said two pressurizing chambers to drive the table by the pressure difference between both pressurising chambers, whereby the gas can be prevented from leaking from portions other than the supply hole and the exhaust hole, thus it can be used even in the environment other than the air atmosphere.

Furthermore, according to the present invention, a positioning device is so constituted that it holds a rotating body integrally forming a rotating axial portion in a cylindrical form and a roughly fan-shaped driving portion rotatably in the inner space of the cylinder, and has the same pressure-adjusting means as described above, respectively, in two kinds of pressurizing chambers formed between the driving portion of said rotating body and the inner space of the cylinder, ejecting a gas into a clearance between said rotating body and the cylinder to hydrostatically support the rotating body as well as introducing this ejected gas into said two kinds of pressurizing chambers to drive the rotating body in the rotational direction by the pressure difference between both pressurising chambers, whereby a positioning device in the rotational direction can be provided, in which a repeated positioning is made possible stably for a long period of time.

I claim:

1. A positioning device, comprising:
    a cylinder containing a piston and a table attached to the piston, the piston being in spaced relationship with the cylinder and defining two chambers within the cylinder,
    pressure-supplying means for introducing gas into the space between the piston and the cylinder to hydrostatically support the piston and into the two chambers, and
    pressure-adjusting means for driving the piston and the table in accordance with pressure differences between the two chambers,
    the pressure-adjusting means comprising:
    at least one nozzle having an ejection port with an opening degree through which gas is let in to and out from one of the two chambers,
    a pressure-adjusting body for changing the opening degree of the ejection port of the at least one nozzle,
    a pressure-supply hole for supplying a gas to periphery of at least one nozzle, and
    at least one exhaust hole for letting the gas out from the nozzle.

2. The positioning device according to claim 1, wherein each said piston and cylinder having either one of a linear scale and a detection head, to constitute a position encoder, thus the position of the piston can be detected.

3. A positioning device, comprising:
    a shaft in spaced relationship with a table that is movable in a linear direction, the table having end faces,
    sealing members flexible in the linear direction on the end faces of table, the sealing members forming two chambers, and
    pressure-supplying means for introducing gas into the space between the table and the shaft to hydrostatically support the table and into the two chambers, and
    pressure-adjusting means for driving the table in accordance with pressure differences between the two chambers, and
    the pressure-adjusting means comprising:
    at least one nozzle having an ejection port with an opening degree through which gas is let in to and out from one of the two chambers,
    a pressure-adjusting body fro changing the opening degree of the ejection port of the at least one nozzle,
    a pressure-supply hole for supplying a gas to periphery of the at least one nozzle, and
    at least one exhaust hole for letting the gas out from the nozzle.

4. A positioning device according to claim 3, wherein said table having either one of a linear scale and a detection head, to constitute a position encoder, thus the position of the table can be detected.

5. A positioning device, comprising:
    a cylinder containing a rotatable body having a driving portion, the driving portion of the rotatable body being in spaced relationship with the cylinder and defining two chambers,
    pressure-supplying means for introducing gas into the space between the rotatable body and the cylinder to hydrostatically support the rotatable body and into the two chambers, and
    pressure-adjusting means for rotationally driving the rotatable body in accordance with pressure differences between the two chambers,
    the pressure-adjusting means comprising:
    at least one nozzle having an ejection port with an opening degree through which gas is let in to and out from one of the two chambers,
    a pressure-adjusting body for changing the opening degree of the ejection port of at least one nozzle,
    a pressure-supply hole for supplying a gas to periphery of the at least one nozzle, and
    at least one exhaust hole for letting the gas out from the nozzle.

6. A positioning device according to claim 5, wherein said rotatable body having a rotational encoder, thus the rotational position of the rotatable body can be detected.

* * * * *